July 6, 1943.                E. W. KELLOGG                2,323,607
                       PHOTOGRAPHIC SOUND RECORDING
                          Filed June 30, 1941
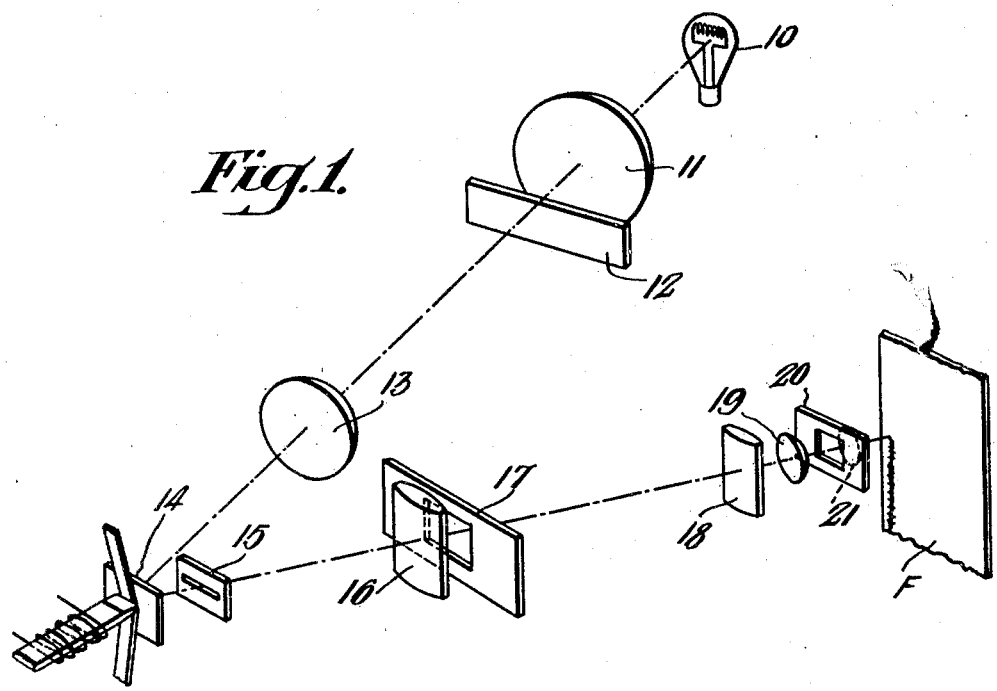
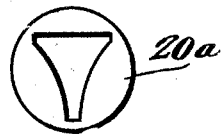
Inventor
Edward W. Kellogg
By
                                                    Attorney Patented July 6, 1943

2,323,607

UNITED STATES PATENT OFFICE 2,323,607

PHOTOGRAPHIC SOUND RECORDING

Edward W. Kellogg, Indianapolis, Ind., assignor to Radio Corporation of America, a corporation of Delaware Application June 30, 1941, Serial No. 400,541

3 Claims. (Cl. 88—24)

This invention relates to a sound recording optical system for making variable density sound records by the use of a galvanometer. Heretofore there have been a number of methods in use for making variable density sound records, such as the glow-lamp system, the light valve and the penumbra system. Of these only the penumbra system uses a galvanometer.

The use of a galvanometer is desirable since it avoids the ribbon velocity distortion which is characteristic of light valve recording. The present system has the advantage over the penumbra system that only a very narrow mirror is required, thereby reducing inertia effects. A uniform light intensity is used instead of a penumbra and the beam of light is moved to a greater or less extent across an aperture stop in the optical system which determines the quantity of light transmitted to the film.

One object of the invention is to provide an improved sound recording optical system of the variable density type.

Another object of the invention is to provide a variable density sound recording optical system using a galvanometer to modulate the light transmitted.

Another object of the invention is to provide a sound recording optical system which is capable of extremely accurate adjustment and calibration.

Other and incidental objects of the invention will be apparent to those skilled in the art from a reading of the following specification and an inspection of the accompanying drawing in which:

Figure 1 is a perspective view of my improved optical systems, the various casings being removed, and Figure 2 is an elevation of an alternative type of aperture which may be used in the apparatus.

Referring first to Fig. 1, light from the source 10 is directed through the condenser lens 11 and past the fixed stop 12. This stop preferably has a straight edge and is shown as reaching approximately to the optical axis of the system. Light passing the stop 12 is directed by the lens 13 upon the galvanometer mirror 14, the light source 10 being imaged upon the mirror 14 by the lenses 11 and 13.

Light reflected by the mirror 14 passes through the slit 15 toward the aperture plate 17. If a narrow filament is used in the lamp 10 or if a very narrow galvanometer mirror is used at 14, the slit 15 may be omitted, if desired, but the slit is advantageous in reducing stray light.

The narrow aperture or slit which determines the width of the line of light focused on the film, is located close to the galvanometer mirror, as shown at 15 in Fig. 1. In the vertical plane this is imaged on the film by lenses 19 and 21, the cylindrical lenses 16 and 18 having no effect in this plane.

The light passing through the slit 15 is directed onto the aperture 17 by the cylindrical condenser lens 16, the purpose of which is to insure illumination of the entire length of the linear image on the film F. In the horizontal plane the light paths are essentially the same as in the usual galvanometer type recording systems in which a narrow slit is located at 17 and a condensing lens at 16. Thus, the width of aperture 17 which is focused on the film by the combined action of lenses 18, 19 and 21, determines the width of the exposed area on the film. The vertical axis cylinder 18 is needed to bring aperture 17 into focus on the film in the horizontal plane, since the spherical lenses 19 and 21 are only strong enough by themselves to image aperture 15 on the film.

Lens 19 in conjunction with the lens 13 forms an image of the stop 12 in the plane of the aperture in the plate 20, and this image is moved up and down across the aperture in the plate 20 by the galvanometer 14, thereby varying the effective aperture with which the film is exposed or in other words varying the quantity of illumination transmitted through this aperture. The light passing through the aperture in the plate 20 is focused by the lens 21 upon the film F in the form of a narrow line extending transversely of the film. The lenses 20 and 21 in the vertical plane (or plane longitudinally of the film) form an image of the slit in the plate 15, or if this slit be omitted, of the galvanometer mirror or filament image therein. The width of the line of light is correspondingly small, since the image in this plane is unaffected by the cylindrical lens 16 and 18.

The arrangement thus far described will produce a variation in illumination on the film which bears a linear relation to the galvanometer deflection. If it is desired to have the variation in light intensity bear some other relation to the galvanometer deflection a differently shaped aperture may be substituted at 20. For example, an aperture shaped as shown at 20a (Fig. 2) will, if mounted in the position shown, be illuminated first at its bottom edge and as the image of the stop 12 moves upwardly across the aperture the illumination will increase more rapidly than in direct proportion to the galvanometer deflection. The shape of the aperture 20a is approximately that which would ordinarily be used to compensate for the curvature of the characteristic curve of the emulsion to be used plotted in terms of opacity versus exposure. The aperture 20a may, of course, be shaped as desired to comply with any other requirements as to corrections either in negative or printing characteristics or may be shaped to provide, in connection with a ground noise reduction system, volume expansion or compression.

I claim as my invention:

1. A sound recording optical system including in sequence, a light source, a condenser lens, a fixed stop defining a side of the light beam, lens means forming an image of said light source, means in the plane of said image for vibrating the beam in accordance with sounds to be recorded, a plate having a light slit therein, means for producing an image of said fixed stop, an aperture plate for receiving said image, and an objective for directing said beam of light in the form of a fine line image of said light slit upon a film, said aperture plate being located in an aperture stop plane of said objective.

2. A sound recording optical system including a light source, a condenser lens, a fixed stop defining a side of the light beam, lens means forming an image of said light source, means in the plane of said image for vibrating the beam in accordance with sounds to be recorded, a plate having a light slit therein, means for producing an image of said fixed stop, an aperture plate for receiving said image, an aperture plate between said slit and said receiving aperture plate, and an objective for directing said beam of light in the form of a fine line image of said light slit having its ends defined by said intermediate aperture plate.

3. A sound recording optical system including a light source, a condenser lens, a fixed stop defining a side of the light beam, lens means forming an image of said light source, means in the plane of said image for vibrating the beam in accordance with sounds to be recorded, a plate having a light slit therein, means for producing an image of said fixed stop, an aperture plate for receiving said image having the aperture therein shaped to compensate for the characteristic curve of the photographic emulsion on which sounds are to be recorded, an aperture plate between said slit and said receiving aperture plate, and an objective for directing said beam of light in the form of a fine line image of said light slit having its ends defined by said intermediate aperture plate.

EDWARD W. KELLOGG.